(12) United States Patent
Janssen

(10) Patent No.: US 11,216,672 B2
(45) Date of Patent: Jan. 4, 2022

(54) DETECTING DRIVING-RELEVANT SITUATIONS AT A LARGER DISTANCE

(71) Applicant: Robert Bosch GmbH, Stuttgart (DE)

(72) Inventor: Holger Janssen, Hessisch Oldendorf (DE)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 16/434,740

(22) Filed: Jun. 7, 2019

(65) Prior Publication Data

US 2019/0384993 A1 Dec. 19, 2019

(30) Foreign Application Priority Data

Jun. 13, 2018 (DE) .......................... 102018209388.1

(51) Int. Cl.
| | |
|---|---|
| *G06K 9/00* | (2006.01) |
| *B60R 1/00* | (2006.01) |
| *G06K 9/34* | (2006.01) |
| *H04N 13/275* | (2018.01) |
| *G06K 9/62* | (2006.01) |
| *H04N 13/271* | (2018.01) |
| *H04N 13/204* | (2018.01) |

(52) U.S. Cl.
CPC ............ *G06K 9/00805* (2013.01); *B60R 1/00* (2013.01); *G06K 9/00208* (2013.01); *G06K 9/342* (2013.01); *G06K 9/6267* (2013.01); *H04N 13/204* (2018.05); *H04N 13/271* (2018.05); *H04N 13/275* (2018.05); *B60R 2300/107* (2013.01); *B60R 2300/301* (2013.01); *B60R 2300/8093* (2013.01)

(58) Field of Classification Search
None
See application file for complete search history.

(56) References Cited

U.S. PATENT DOCUMENTS 10,042,079 B2 * 8/2018 Patnaik ..................... G06T 7/11
10,891,497 B2 * 1/2021 Cox ..................... G06K 9/6256
(Continued)

FOREIGN PATENT DOCUMENTS

| DE | 10 2015 205 135 A1 | 9/2016 |
|---|---|---|
| EP | 2 084 045 A1 | 8/2009 |

*Primary Examiner* — Nancy Bitar
(74) *Attorney, Agent, or Firm* — Norton Rose Fulbright US LLP; Gerard Messina

(57) ABSTRACT

A method for detecting a relevant region in the surroundings of an ego vehicle, in which a situation exists which is relevant to the driving and/or safety of the ego vehicle, from measurement data of a sensor which observes at least a portion of the surroundings, the measurement data being discretized into pixels or voxels and/or are suitably represented in some other way, the existence of the relevant situation being dependent on the presence of at least one characteristic object in the surroundings, and the resolution of the pixels, voxels and/or the other representation being insufficient for directly detecting the characteristic object, the measurement data being analyzed for the presence of a grouping of objects which contains the characteristic object, the resolution of the pixels, voxels and/or the other representation being sufficient for detecting the grouping. A region in which the grouping is detected is classified as a relevant region.

11 Claims, 3 Drawing Sheets

(56) References Cited

U.S. PATENT DOCUMENTS

| | | | |
|---|---|---|---|
| 2015/0269844 A1* | 9/2015 | Arndt | G08G 1/167 |
| | | | 340/435 |
| 2015/0325013 A1* | 11/2015 | Patnaik | G06T 11/008 |
| | | | 345/424 |
| 2016/0371549 A1* | 12/2016 | Thiel | G06K 9/6267 |
| 2018/0189578 A1* | 7/2018 | Yang | G06K 9/4638 |
| 2019/0130182 A1* | 5/2019 | Zang | G06K 9/00651 |

\* cited by examiner

DETECTING DRIVING-RELEVANT SITUATIONS AT A LARGER DISTANCE

CROSS REFERENCE

The present application claims the benefit under 35 U.S.C. § 119 of German Patent Application No. DE 102018209388.1 filed on Jun. 13, 2018, which is expressly incorporated herein by reference in its entirety.

FIELD

The present invention relates to a method for evaluating measurement data from the surroundings of an ego vehicle, by which driving-relevant situations at long distance from the ego vehicle may be detected earlier in terms of time and location while retaining the same physical resolution of the sensor system used.

BACKGROUND INFORMATION

Depending on the situation, driving a vehicle in traffic requires the acquisition of information from areas surrounding the vehicle, which are located at greatly varying distances from the vehicle. When turning right, for example, it is necessary to look over the shoulder in order to check whether there is another road user wishing to travel straight ahead who is located immediately to the right next to the host vehicle, in the "blind spot" of the mirrors. In fast-moving traffic on expressways or on rural roads, on the other hand, it is necessary to look very far ahead so as to be able to react in good time to any driving-relevant situations. For instance, at a speed of 200 km/h, the stopping distance according to the rule of thumb is more than 450 m. A tail end of a traffic jam for example must be detected at this distance in order to avoid a collision.

An attentive human driver may look both at close range and into the distance using one and the same pair of eyes as sensors. Technological sensors used for this purpose are typically specialized for particular distance ranges. For instance, European Patent No. EP 2 084 045 B1 describes combining multiple sensors which have different detection ranges and bridging the intermediate ranges by using a transfer algorithm. Further general related art regarding object detection is described in U.S. Patent Application Publication No. US 2016/371 549 A1 and in German Patent Application No. DE 10 2015 205 135 A1.

SUMMARY

Within the context of the present invention, an example method is provided for detecting at least one relevant region in the surroundings of an ego vehicle, in which a situation exists which is relevant to the driving and/or safety of the vehicle, from measurement data of at least one sensor. The ego vehicle is the vehicle whose surroundings are being observed and on whose behavior action is to be taken on the basis of the observation.

The sensor observes at least a portion of the surroundings, wherein the measurement data are discretized into pixels or voxels and/or are suitably represented in some other way. The sensor may encompass, for example, a camera, a radar sensor, an ultrasonic sensor, a location sensor, and/or a LIDAR sensor.

The problem is that the existence of the relevant situation is dependent on the presence of at least one characteristic object in the surroundings, while at the same time the resolution of the pixels, voxels and the other representation is insufficient for directly detecting the characteristic object.

For example, if the relevant situation is a traffic jam, then the characteristic object is another vehicle in the lane along which the ego vehicle is driving. Based on the fixed discretization of the measurement data into pixels or voxels, this other vehicle may be detected from a camera image only once there is less than a particular minimum distance and the other vehicle accordingly takes up a particular minimum number of pixels in the image.

The approach is based on the measurement data being analyzed for the presence of a grouping of objects which contains the characteristic object, the resolution of the pixels, voxels and the other representation being sufficient for detecting the grouping.

For example, in the case of a traffic jam on a multi-lane expressway, generally all lanes are congested so that multiple vehicles are at a standstill next to one another at the tail end of the traffic jam. The grouping of multiple vehicles next to one another is considerably larger than one individual vehicle and thus takes up considerably more pixels in a camera image for example. This grouping may therefore be detected at a larger distance than an individual vehicle.

A region in which the grouping is detected is classified as a relevant region, i.e., a region in which there is a situation which is relevant to the driving and/or safety of the ego vehicle. Since this detection may take place at a larger distance under otherwise identical measurement data acquisition conditions, arbitrary measures for acting on the behavior of the ego vehicle or even just warning the driver of the latter about a potentially hazardous situation may accordingly be taken earlier.

The relevant region need not necessarily be located ahead of the ego vehicle in the direction of travel. For example, a detection of the rear surroundings behind the ego vehicle may be important for recognizing whether it is safe to change into the passing lane. Due to the possible high approach speeds of more than 100 km/h, the limited detection range of technological sensors has until now been a limiting factor with regard to situations in which a passing maneuver may be permitted during at least semi-automated driving.

A detection of the surroundings to the side of the ego vehicle may be important for intersection scenarios, for example. In areas of intersections at which it is possible to turn onto priority rural roads, there is usually a speed limit of 70 km/h for vehicles on the rural road. Sometimes there may even be no special restriction so that, also here, approach speeds of 100 km/h are possible during the turning maneuver.

The recognition of the relevant region or situation is not limited to using only the measurement data of the sensor. It may optionally also use further data sources.

In one particularly advantageous embodiment, another vehicle is selected as the characteristic object. The grouping encompasses as a further object, besides the other vehicle, at least one further other vehicle and/or at least one road boundary and/or at least one lane marking and/or at least one additional object characteristic of the grouping.

As previously mentioned, a grouping which contains multiple other vehicles may be used to detect a traffic jam situation. However, yet more scenarios may be detected on the basis of such a grouping. For example, particular formations of other vehicles may indicate that these other vehicles are all evading an object or a situation in an identical manner, for instance an accident situation or an object lying on the road. Vehicles located very close to one another or a mixture of vehicles oriented longitudinally and transversely with respect to the direction of travel may be interpreted, for example, as signs of an accident situation. A formation of other vehicles which may be identified as a row of emergency vehicles may also indicate an accident situation, for example. A constellation consisting of a front part of one other vehicle surrounded by multiple rear parts of other such vehicles may indicate a wrong-way driver.

The grouping is therefore not limited to all the other vehicles contained therein being shown from the same point of view, for example.

The term "other vehicle" is not limited to a particular type of vehicle but rather encompasses, for example, cars, trucks, motorcycles, bicycles, special-purpose vehicles such as cranes or heavy transport vehicles, construction machines such as wheeled loaders, industrial trucks such as forklifts, agricultural vehicles such as tractors, or emergency vehicles.

Groupings which include a road boundary and/or lane marking in addition to another vehicle make it possible to detect a single other vehicle at a larger distance. For example, a constellation of a front part of another vehicle with a boundary or marking on the lane of the ego vehicle may indicate a wrong-way driver. Early warning of wrong-way drivers is particularly important since the speeds of the ego vehicle and of the wrong-way driver add up to a substantial approach speed which barely leaves any time for evasive action.

In another particularly advantageous embodiment, a vehicle component which is separated from the vehicle or a cargo item which is separated from the vehicle is selected as the characteristic object. The grouping encompasses as a further object, besides the component or the cargo item, at least one road boundary and/or at least one lane marking.

The cargo item may in particular be, for example, an item which is typically attached to the outside of the vehicle for transport purposes, such as a bicycle, a roof box, a piece of sports equipment, a spare wheel, a tension belt, or a piece of luggage. The component may be, for example, a tailpipe or a bumper.

By virtue of being grouped with the road boundary and/or with the lane marking, the component or the cargo item may be detected at a larger distance. In this way, countermeasures may be taken in good time in order to avoid a collision.

Especially lane markings and road boundaries as further members of the grouping have the advantage that these are present in virtually all traffic areas and thus universally enable the indirect finding of the characteristic object. In principle, the other members of the grouping may also be any other objects in the landscape, such as buildings, terrain or vegetation, or any other elements of the traffic infrastructure, such as road signs, traffic lights, anti-noise barriers, tunnels or bridges.

In another particularly advantageous embodiment, additionally a change in size or change in density of the grouping over time, and/or a relative speed of the grouping relative to the ego vehicle, and/or a relative speed of the grouping relative to a road, is evaluated from the measurement data. Furthermore, the assessment as to whether a region containing the grouping is a relevant region additionally depends on the change in size or change in density over time, and/or on the relative speed.

A change in size of the grouping over time may indicate, for example, a change in the distances between multiple other vehicles forming the grouping. For example, if a grouping of preceding other vehicles is becoming smaller, this may indicate that these other vehicles are approaching one another. This may in turn indicate that these other vehicles are braking, for example because a traffic jam is forming or a traffic light has turned to red.

A change in density of the grouping relates to the density of objects within the grouping. Even if the individual objects of the grouping cannot be detected independently of one another, the density may nevertheless be observed. For example, a road area containing multiple vehicles has a different brightness than an empty road area.

Movement patterns may in turn be deduced from the density of the objects within the grouping, particularly if these movement patterns cannot be observed directly at a large distance from the ego vehicle. For example, traffic that is travelling close together moves more slowly than traffic in which vehicles are at a constant distance from one another. A fluctuating object density may also indicate a stop-and-go situation, for example. A density increase which gradually spreads counter to the direction of travel from a starting point may indicate, for example, that an object in the vicinity of this starting point has stopped suddenly.

If the grouping encompasses, for example, besides another vehicle, also a road boundary or lane marking, the size of said grouping may change, for example, when the distance between the other vehicle and the road boundary or lane marking changes. Such a change may indicate, for example, a lateral evading movement of the other vehicle to avoid a collision object. In this way, a possible collision object, that is instantaneously not visible from the ego vehicle, may be detected in good time.

Alternatively or also in combination, the relative speed of the grouping as a whole relative to the ego vehicle and/or relative to the road may be evaluated. If, for example, a grouping of multiple other vehicles moves ahead at a constant spacing, there is no acute need for action. If, in contrast, this grouping is stationary on the road, the ego vehicle must be braked in order to avoid a collision.

In this connection, the term "relative speed" is to be understood vectorially and also encompasses changes in direction. If, for example, a grouping of other vehicles suddenly changes direction, this may indicate that the grouping as a whole is evading an object or a situation or is reacting to the object or situation in some other way.

For example, evading movements of a plurality of other vehicles may indicate that an emergency vehicle is approaching, long before the emergency vehicle itself may be detected by the sensor system of the ego vehicle.

In another particularly advantageous embodiment, in response to a region having been classified as a relevant region, i.e., that a situation relevant to the ego vehicle has been detected in this region, the sensor, and/or a device which aids the acquisition of measurement data by the sensor, is actuated with a control variable in order to change a physical parameter of the measurement data acquisition. Further measurement data relating to the relevant region are then acquired. In this way, the situation existing in the region may be more thoroughly analyzed and/or classified.

For example, if the sensor is a camera, the focus setting or exposure setting may be altered and/or the lens of the camera may be changed or zoomed. An infrared floodlight may also be activated, for example, in order to illuminate the relevant region for recording the image again.

Alternatively or also in combination, for this purpose a further sensor may be actuated and/or incorporated in order to acquire further measurement data from the relevant region. For example, a division of work may be implemented in such a way that a first, rapid sensor serves for detecting relevant regions while a second, slower sensor serves for analyzing these regions in detail.

In another particularly advantageous embodiment, such a change in the physical parameter of the measurement data acquisition is selected that, after the change, the resolution of the pixels, voxels and the other representation is sufficient to detect the characteristic object. Alternatively or in combination, a further sensor is selected whose resolution of the pixels, voxels and the other representation is sufficient to detect the characteristic object.

For example, after a grouping at a large distance ahead of the ego vehicle has been detected, the lens of a camera may be zoomed so far that the grouping is imaged in a format-filling manner and individual objects within the grouping are recognizable. However, a second camera may also be actuated for example, which images the relevant region containing the grouping in a format-filling or at least sufficiently large manner. The actuation and/or incorporation of a further sensor has the advantage that the first sensor may continue to observe a relatively large area, and the detailed analysis of the region identified as relevant does not result in a further event that occurs in the interim in the vehicle surroundings remaining unnoticed by the first sensor.

In another particularly advantageous embodiment, to check for the presence of the grouping, a subset of the measurement data relating to a region of the surroundings of the ego vehicle that is located at a predefined minimum distance from the ego vehicle is pre-selected. In this way, computing capacity may be saved. The resolution of the pixels, voxels and the other representation of the sensor is generally dimensioned in such a way that it is sufficient for direct detection of objects in the closer surroundings of the ego vehicle. This direct detection is often much less complex than the detection of groupings.

In another particularly advantageous embodiment, from a plurality of objects and/or groupings detected on the basis of the measurement data, a portion of the measurement data that is attributed to the detected objects and/or groupings is ascertained on the basis of a model of the contrast mechanism, and/or further physical imaging models, for the acquisition of the measurement data, for example using a camera. In this way, the portion of the measurement data that could not be assigned to any object or any grouping may be identified. This portion may possibly indicate a further object which is not yet recognizable in the measurement data in a clear enough manner to be unambiguously identified. A region in which such unclarified objects are located may for example likewise be identified as relevant.

If, for example, the measurement data are image data from a camera, all detected objects and groupings may for example be combined to form a synthetic image, and this image may be compared with the original image. If it is then found, for example, that the synthetic image differs significantly from the original image in a very limited region, a further object may possibly be located there. The fact that this object is not clearly identifiable is then possibly of secondary importance;

what is of primary importance is that a collision with the object is avoided.

The difference formation between the synthetically generated measurement data and the actual measurement data may also be used, for example, as feedback for refining the model of the contrast mechanism, and/or further physical imaging models. In this way, the detection of the grouping may be improved.

In another particularly advantageous embodiment, in response to a region having been classified as a relevant region, a physical warning mechanism which is perceptible to the driver of the ego vehicle is actuated, and/or a drive system, a steering system and/or a braking system is actuated for the purpose of avoiding negative consequences for the ego vehicle, for the driver thereof or for other road users, and/or for the purpose of adapting the speed and/or trajectory of the ego vehicle.

Even the warning that a situation which is important to the driving and/or safety of the ego vehicle exists at a relatively large distance may possibly mitigate this situation if the driver then, as a precaution, reduces the speed by taking his foot off the gas and pays particular attention to observing the region in the distance himself. The warning may also be made more concrete, for example, by highlighting the region in a head-up display or in a comparable display device. Within the context of a driving assistance system or of at least semi-automated driving, there may even be a direct intervention in the driving dynamics. In addition, a basis may even be established for prompting the driver to take control of the vehicle and for deactivating automatic driving functions.

Optionally, a warning may also be output to the traffic behind, for example by flickering brake lights and/or by sending messages via a V2V (Vehicle-to-Vehicle) or V2I (Vehicle-to-Infrastructure) interface. In this way, the risk of a following other vehicle rear-ending the ego vehicle, which from the other vehicle's point of view is braking unexpectedly, may be reduced.

The basic devices for detecting objects in vehicle surroundings are already present in many vehicles. Often the core item used for this is a classifier module, which classifies measurement data according to the content of sought entities. The described method may be implemented in such a classifier module and may be retrofitted in existing vehicle systems, for example.

Therefore, the present invention also relates to a classifier module for detecting objects in measurement data which have been obtained from the surroundings of an ego vehicle. The classifier module receives the measurement data as input and delivers, as output, probabilities that the measurement data indicate the presence of one or multiple instance(s) of one or multiple entities from a predefined set of sought entities.

The sought entities encompass at least
one grouping of multiple vehicles,
one grouping of one or multiple vehicle(s) together with at least one road boundary and/or with at least one lane marking, and/or
one grouping of at least one component separated from a vehicle and/or a cargo item of the vehicle together with at least one road boundary and/or with at least one lane marking and/or with at least one additional object characteristic of the grouping.

As previously explained, the existence of an object characteristic of a relevant situation may be deduced from the presence of such groupings. In this way, the situation as a whole may be detected at a much larger distance than if it were necessary to detect the characteristic object individually.

Conventional classifier modules are optimized to detect individual objects. If, for example, another vehicle is joined by a lane marking in the input data, then the probabilities that a vehicle on the one hand and a lane marking on the other hand are present in the region in question will be addressed separately from one another. In contrast, in the classifier module provided here, a further probability will additionally address the fact that the grouping made up of another vehicle and a lane marking is present.

In one particularly advantageous embodiment, the classifier module is trained or is trainable using learning input data and respectively associated learning output data indicating the sought entities recognizable in the learning input data. For example, an existing classifier module of this type may be expanded in terms of its functionality by being subsequently trained using additional learning input data and associated learning output data relating to groupings of objects.

Such an expansion is possible in particular in one particularly advantageous embodiment in which the classifier module encompasses at least one artificial neural network, ANN.

The present invention also relates to a data set including learning input data and associated learning output data for the described classifier module. The data set includes at least
one grouping of multiple vehicles,
one grouping of one or multiple vehicle(s) together with at least one road boundary and/or with at least one lane marking, and/or
one grouping of at least one component separated from a vehicle and/or a cargo item of the vehicle together with at least one road boundary and/or with at least one lane marking and/or with at least one additional object characteristic of the grouping,
as sought entities which are represented in the learning input data and learning output data.

This data set alone may already be sufficient to further train an existing classifier module, and, thus, to expand this module in the described manner in terms of its function. Therefore, this data set is also a separately sellable product in which the present invention may be embodied.

According to what has been described above, the present invention also relates to a computer program including machine-readable instructions which, when executed on a computer and/or on a control unit and/or on a classifier module, prompt the computer, the control device to upgrade the classifier module to a classifier module according to the present invention and/or prompt it to carry out a method according to the present invention. This computer program may also embody the invention and may be sold for example as an update or upgrade to an existing object detection system. The present invention also relates to a machine-readable data carrier or download product containing the computer program.

Further measures which improve the present invention will be presented in greater detail below together with the description of the preferred exemplary embodiments of the present invention, with reference to figures.

DETAILED DESCRIPTION OF EXAMPLE EMBODIMENTS

Figure 1:
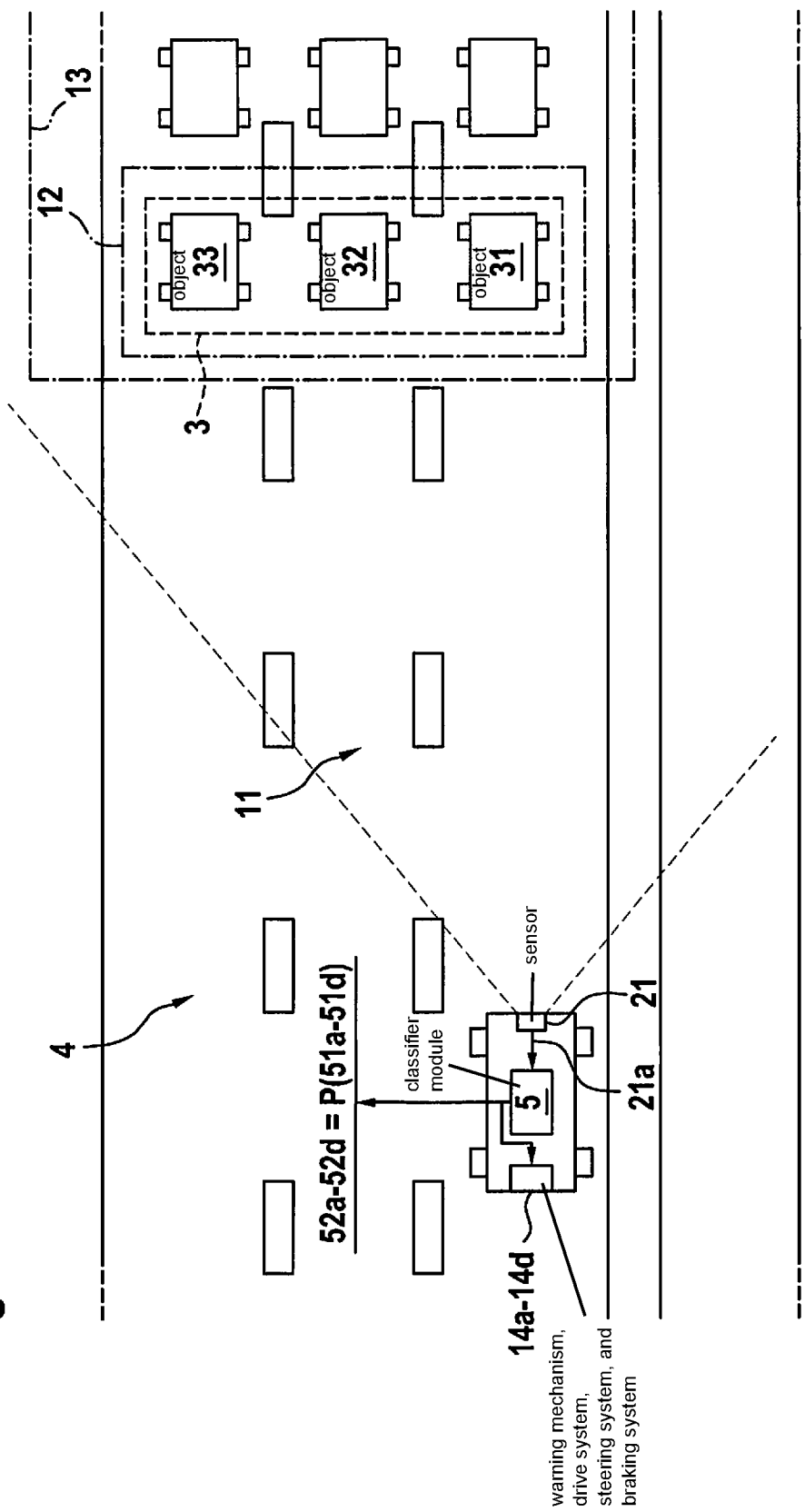
FIG. 1 shows a schematic diagram, not true to scale, of a use case for method 100.

In FIG. 1, the ego vehicle 1 is moving from left to right along a road 4 designed as a three-lane expressway. Surroundings 11 of ego vehicle 1 are detected by a sensor 21. Sensor 21 delivers measurement data 21a to a classifier module 5, which searches the measurement data for a range of predefined entities 51a through 51d, such as other vehicles for example. In each case, the classifier module outputs a probability 52a-52d=P (51a through 51d) that the sought entity 51a through 51d has been detected in measurement data 21a. An appropriate response is then initiated. For example, a warning mechanism 15a, a drive system 14b, a steering system 14c and/or a braking system 14d may be actuated.

In the example shown in FIG. 1, the situation 13, where the traffic was jammed, exists in surroundings 11 of ego vehicle 1. The fact that this situation 13 is relevant to the driving and the safety of ego vehicle 1 is based on the other vehicle in the same lane as ego vehicle 1 and closest thereto in the direction of travel. This other vehicle is characteristic object 31, which nevertheless cannot be detected at a large distance due to the limited pixel resolution of sensor 21.

Classifier module 5 searches measurement data 21a specifically for a grouping 3 in which characteristic object 31 is combined with, in this example, further other vehicles as further objects 32 and 33. A region in surroundings 11 of ego vehicle 1 in which this grouping 3 is found is classified as region 12 in which situation 13 exists. Since grouping 3 is spatially much larger than constituents 31 through 33 thereof, it may be detected much earlier in measurement data 21a for the same pixel resolution of sensor 21.

Figure 2:
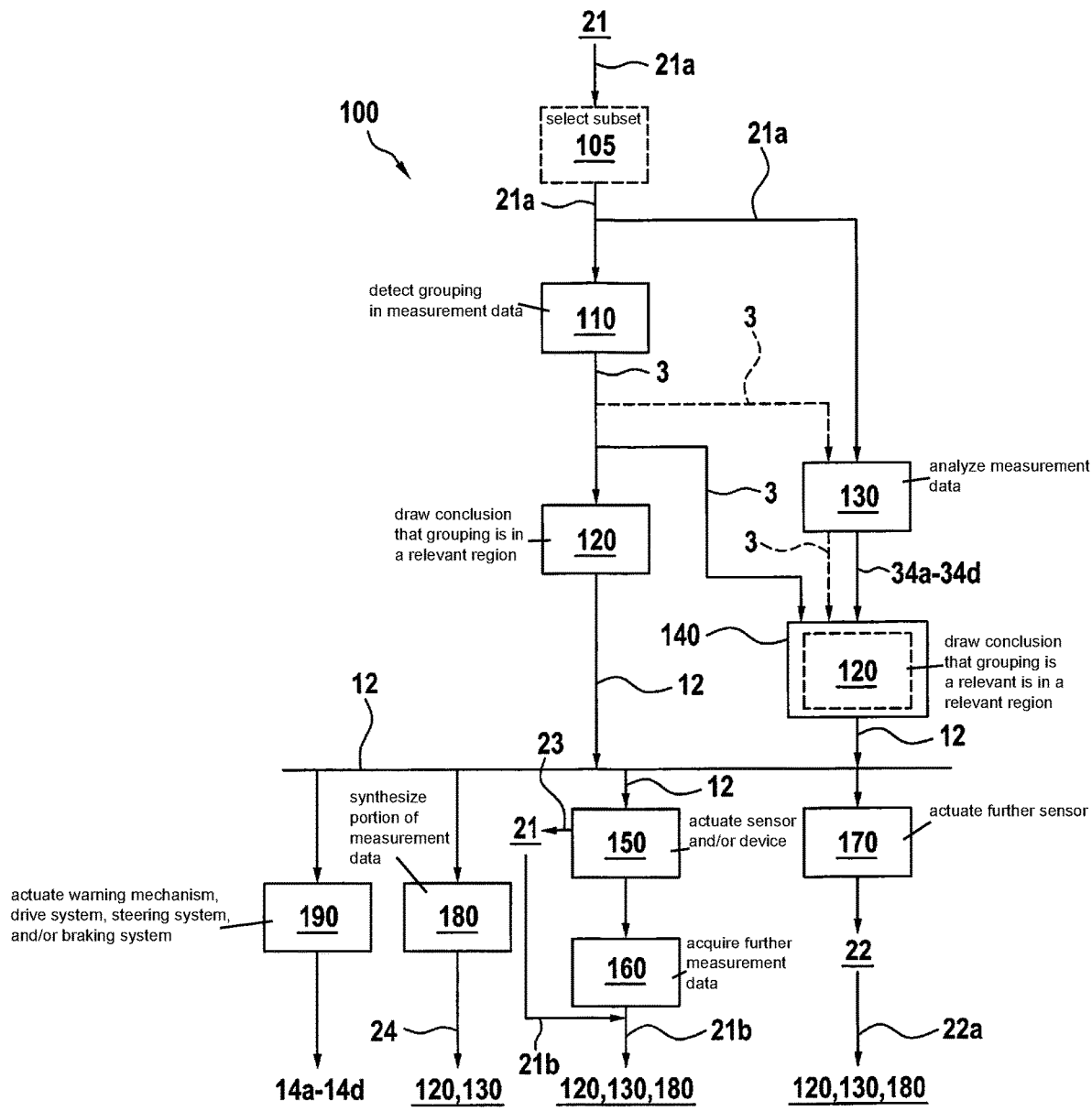
FIG. 2 shows an exemplary embodiment of method 100.

FIG. 2 illustrates, by way of example, the sequence of method 100. From measurement data 21a delivered by sensor 21, optionally in step 105 a subset is selected which belongs to a "region of interest" at a relatively large distance from ego vehicle 1. The thinking behind this is that the relatively complex detection of groupings is unnecessary if the constituents of the groupings may also be directly detected individually.

In step 110, grouping 3 is detected in measurement data 21a. In step 120, the conclusion is drawn therefrom that the region containing grouping 3 is a region 12 which is relevant to the driving and/or safety of ego vehicle 1.

However, measurement data 21a may also be analyzed in step 130 for a change in size 34a or a change in density 34b of grouping 3, for a relative speed 34c of grouping 3 relative to ego vehicle 1, and/or for a relative speed 34d of grouping 3 relative to road 4; grouping 3 may have been detected previously in step 110 but may also be detected within step 130.

In step 140, based on the presence of grouping 3 in a region in vehicle surroundings 11, together with the additional information 34a through 34d, the conclusion is drawn that this region is a region 12 which is relevant to the driving and/or safety of ego vehicle 1. The work of step 120 is therefore also performed within step 140 albeit on the basis of expanded information.

Regardless of how exactly knowledge about the relevant region 12 has been obtained, various further measures are now possible.

In step 150, sensor 21 and/or a device (not shown in FIG. 2) which supports this sensor 21 may be actuated with a control variable 23. Then, in step 160, further measurement data 21b relating to the relevant region 12 may be acquired by sensor 21.

In step 170, a further sensor 22 may be actuated to acquire further measurement data 22a relating to the relevant region 12.

In step 180, portion 24 of the measurement data 21a, 21b, 22a that is attributed to the detected objects 31 through 33 or groupings 3 may be synthetized for the purpose of comparison with the original measurement data. In this way, the model of the contrast mechanism, and/or further physical imaging models of the camera, may be refined for the acquisition of measurement data 21a, 21b, 22a, which is in turn beneficial to the analysis in steps 120 and 130.

Finally, in step 190, warning mechanism 14a, drive system 14b, steering system 14c and/or braking system 14d may be actuated.

Figure 3:
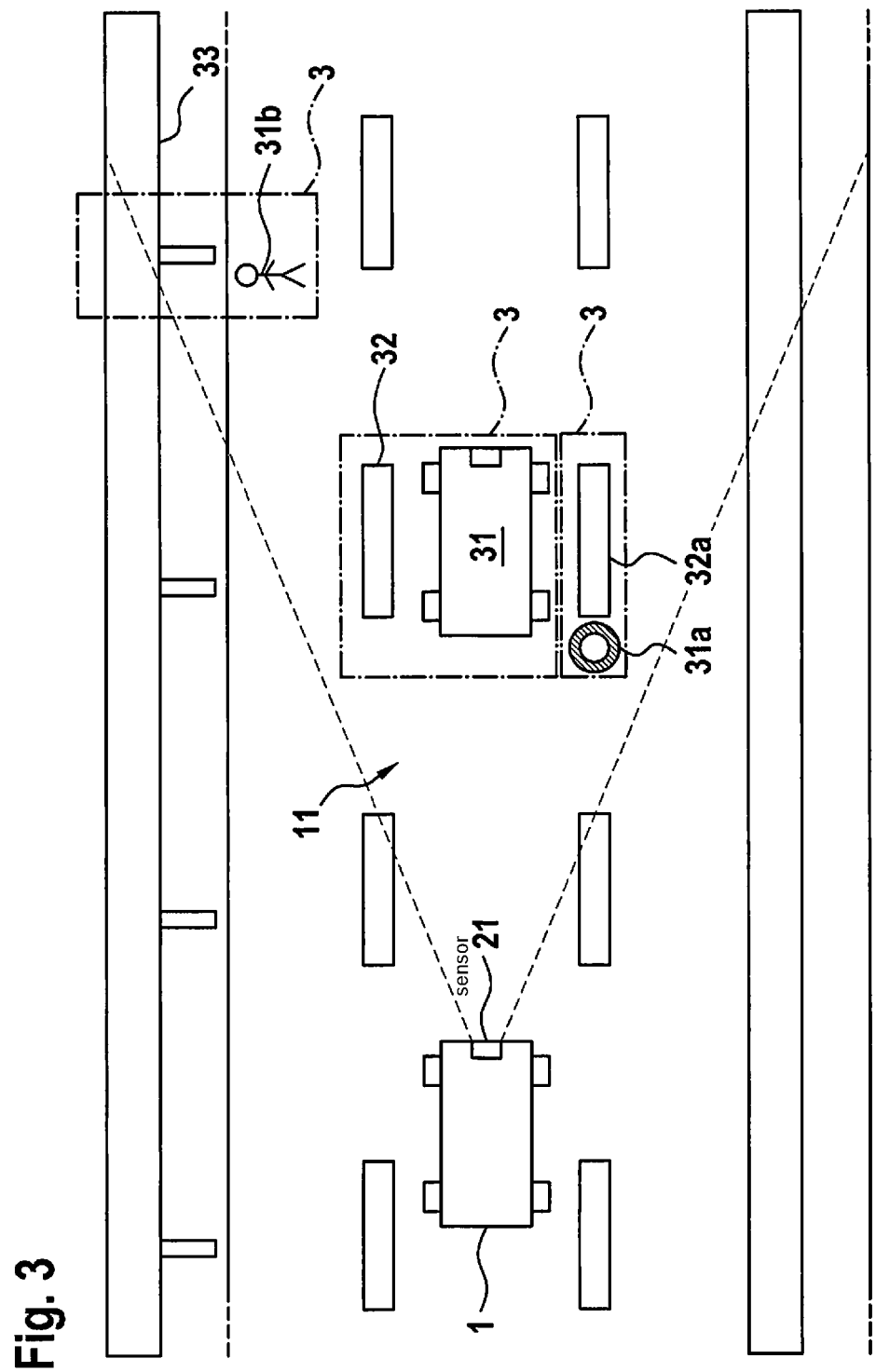
FIG. 3 shows a schematic diagram, not true to scale, of groupings containing further objects 32, 33 which are not other vehicles.

FIG. 3 schematically shows further possible groupings 3, with the aid of which a characteristic object 31 may be made detectable indirectly. Another vehicle as characteristic object 31 is grouped with a first lane marking as a further object 32. A lost tire as characteristic object 31a is grouped with a second lane marking as a further object 32a. A pedestrian as a characteristic object 31b is grouped with a road boundary as a further object 33.

What is claimed is:

1. A method for detecting at least one relevant region in surroundings of an ego vehicle, which is in a traffic situation, in which a situation exists which is relevant to the driving and/or safety of the ego vehicle from relevant measurement data of at least one sensor, which observes at least a portion of the surroundings, the method comprising:
    discretizing the measurement data onto pixels or voxels, wherein an existence of the situation is dependent on a presence of at least one characteristic object in the surroundings, and wherein a resolution of the pixels and/or the voxels being insufficient for directly detecting the characteristic object;
    analyzing the measurement data to detect a presence of a grouping of objects which contains the characteristic object, wherein the resolution of the pixels and/or the voxels is sufficient for detecting the grouping;
    classifying a region in which the grouping is detected as a relevant region; and
    evaluating, from the measurement data, at least one of: a change in size of the grouping over time and a change in density of the grouping over time, and wherein an assessment as to whether a region containing the grouping is a relevant region additionally depends on at least one of: the change in size over time and/or the change in density;
    wherein the grouping is detectable at a larger distance than another vehicle in the traffic situation, and
    wherein the sensor delivers the measurement data to a classifier module, which searches the measurement data for a range of predefined entities, and wherein in each case, the classifier module outputs a probability that the sought entity has been detected in the measurement data, and a response is initiated, and wherein the response includes actuating at least one of a warning mechanism, a drive system, a steering system, and/or a braking system.

2. The method as recited in claim 1, wherein another vehicle is selected as the characteristic object, and the grouping encompasses as a further object, in addition to the other vehicle, at least of: one further other vehicle; at least one road boundary; at least one lane marking; and/or at least one additional object characteristic of the grouping.

3. The method as recited in claim 1, wherein a vehicle component, which is separated from a vehicle, or a vehicle cargo item, which is separated from the vehicle, is selected as the characteristic object, and the grouping encompasses, as the further object, in addition to the component or the cargo item, at least one road boundary and/or at least one lane marking.

4. The method as recited in claim 1, further comprising:
    evaluating, from the measurement data, a relative speed of the grouping relative to the ego vehicle, and/or a relative speed of the grouping relative to a road, and wherein an assessment as to whether a region containing the grouping is a relevant region additionally depends on the relative speed.

5. The method as recited in claim 1, wherein, in response to a region having been classified as a relevant region, a sensor and/or a device which supports acquisition of the measurement data by the sensor, is actuated with a control variable to change a physical parameter of the measurement data acquisition, and subsequently further measurement data relating to the relevant region are acquired.

6. The method as recited in claim 1, wherein, in response to a region having been classified as a relevant region, a further sensor is actuated and/or incorporated to acquire further measurement data from the relevant region.

7. The method as recited in claim 5, wherein such a change in the physical parameter of the measurement data acquisition is selected that, after the change, the resolution of the pixels and/or the voxels is sufficient to detect the characteristic object, and/or a further sensor is selected whose resolution of the pixels and/or the voxels is sufficient to detect the characteristic object.

8. The method as recited in claim 1, wherein, to check for the presence of the grouping, a subset of the measurement data relating to a region of the surroundings of the ego vehicle that is located at a predefined minimum distance from the ego vehicle is pre-selected.

9. The method as recited in claim 7, wherein, from a plurality of objects and/or groupings detected based on the measurement data, a portion of the measurement data that is attributed to the detected objects and/or groupings is ascertained on the basis of a model of a contrast mechanism, and/or further physical imaging models, for the acquisition of the measurement data.

10. The method as recited in claim 1, wherein, in response to a region having been classified as a relevant region, at least one of: a physical warning mechanism, which is perceptible to a driver of the ego vehicle, is actuated, and/or the drive system is actuated; the steering system is actuated; the braking system is actuated, for avoiding negative consequences for the ego vehicle, for the driver or for other road users, and/or for adapting a speed of the ego vehicle and/or a trajectory of the ego vehicle.

11. A non-transitory machine-readable storage medium, on which is stored a computer program containing machine-readable instructions, which is executable on a computer and/or a control unit and/or a classifier module, comprising:
    a program code arrangement having program code for detecting at least one relevant region in surroundings of an ego vehicle, which is in a traffic situation, in which a situation exists which is relevant to the driving and/or safety of the ego vehicle from relevant measurement data of at least one sensor, which observes at least a portion of the surroundings, by performing the following
    (i) upgrade the classifier module to a classifier module as for detecting objects in measurement data which have been obtained from surroundings of an ego vehicle, the classifier module configured to receive the measurement data as input and to deliver, as output, probabilities that the measurement data indicate a presence of one or multiple examples of one or multiple entities from a predefined set of sought entities, the sought entities including at least one of:
    (a) at least one grouping of multiple vehicles, (b) at least one grouping of one or multiple vehicles together with at least one road boundary and/or with at least one lane marking, and/or (c) at least one grouping of at least one component separated from a vehicle and/or a cargo item of the vehicle together with at least one road boundary and/or with at least one lane marking and/or with at least one additional object characteristic of the grouping, and (ii) detecting at least one relevant region in surroundings of an ego vehicle, in which a situation exists which is relevant to the driving and/or safety of the ego vehicle from relevant measurement data of at least one sensor, which observes at least a portion of the surroundings, by performing the following:

discretizing the measurement data onto pixels or voxels, wherein an existence of the situation is dependent on a presence of at least one characteristic object in the surroundings, and wherein a resolution of the pixels and/or the voxels being insufficient for directly detecting the characteristic object;

analyzing the measurement data to detect a presence of a grouping of objects which contains the characteristic object, wherein the resolution of the pixels and/or the voxels is sufficient for detecting the grouping;

classifying a region in which the grouping is detected as a relevant region; and evaluating, from the measurement data, at least one of: a change in size of the grouping over time and a change in density of the grouping over time, and wherein an assessment as to whether a region containing the grouping is a relevant region additionally depends on at least one of: the change in size over time and/or the change in density, wherein the grouping is detectable at a larger distance than another vehicle in the traffic situation, and wherein the sensor delivers the measurement data to a classifier module, which searches the measurement data for a range of predefined entities, and wherein in each case, the classifier module outputs a probability that the sought entity has been detected in the measurement data, and a response is initiated, and wherein the response includes actuating at least one of a warning mechanism, a drive system, a steering system, and/or a braking system.

* * * * *